Patented Aug. 5, 1952

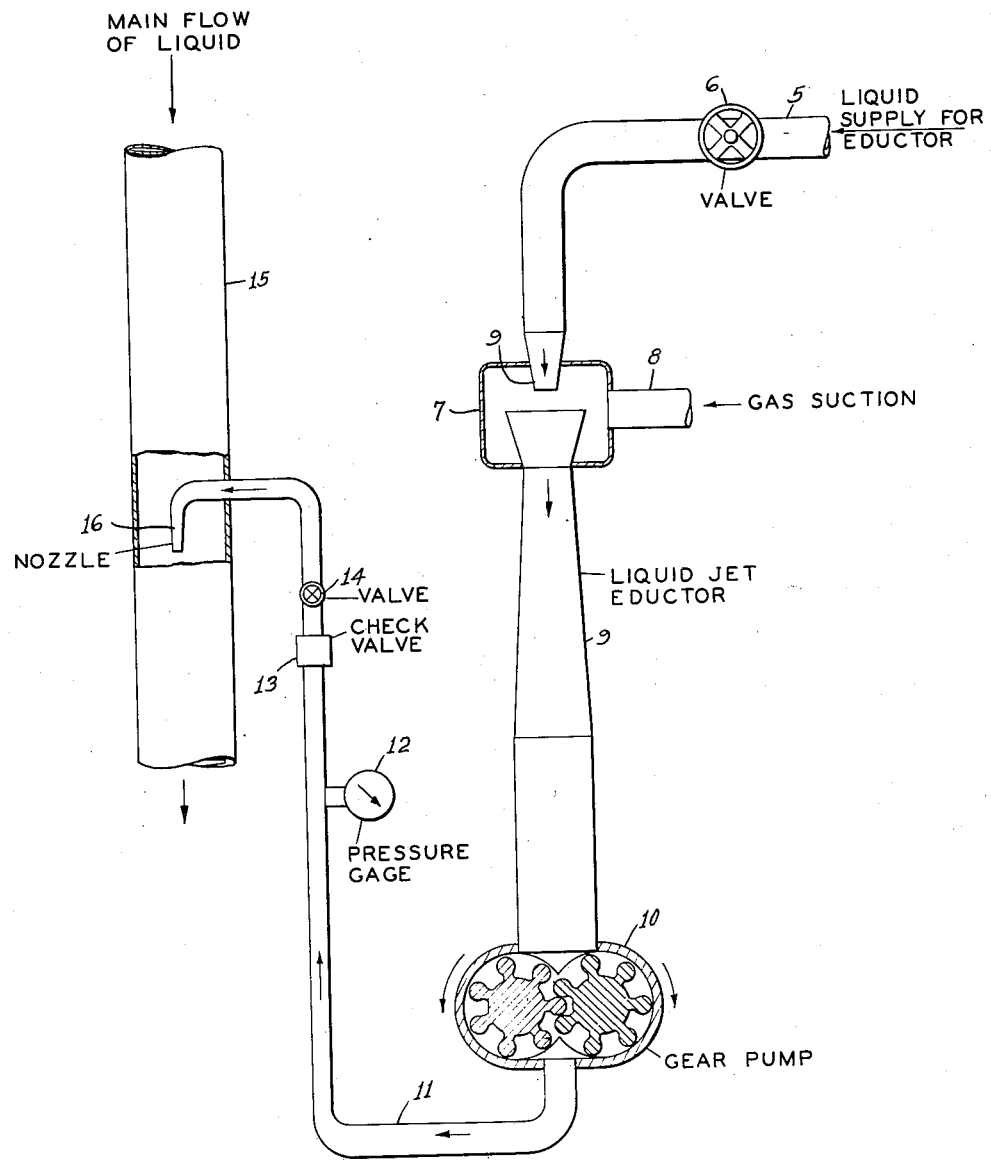

2,606,150

UNITED STATES PATENT OFFICE 2,606,150

DISPERSION OF GASEOUS TREATING AGENTS IN LIQUIDS

Clark E. Thorp, Chicago, Ill., assignor, by mesne assignments, to Air Reduction Company, Incorporated, New York, N. Y., a corporation of New York Application April 8, 1948, Serial No. 19,705

8 Claims. (Cl. 210—31)

This invention relates to the dispersion of gaseous treating agents in liquids, and particularly to improvements in the method of introducing the gaseous treating agent into the liquid to be treated. While the invention is described with reference to the use of ozone as a treating agent for water, it is not limited to this special application.

The usual method of applying gaseous treating agents to liquids is to bubble the gas through the liquid in a tower or other suitable receptacle. Efficiency of the treatment varies inversely with the diameter of the bubbles and, since there is a limit to the fineness of the bubbles which can be produced by ordinary mechanical means, the efficiency of the ordinary procedure is relatively low.

Thus, in the treatment of water with ozone for the purpose of affecting bacteria and organic matter, it is necessary in the ordinary method to use 4 grams of ozone to purify 1,000,000 grams of water. While the proportion of four parts per million may appear small, it is much greater than the amount required if efficient dispersion is maintained. This is evidenced by the fact that much of the ozone goes entirely through the tower without undergoing decomposition. The ozone is lost unless it is separated and recompressed for further use.

It is the object of the present invention to provide a simple and economical method of applying gaseous treating agents to liquids whereby the gaseous treating agent is dispersed more effectively and hence utilized to greater advantage.

Other objects and advantages of the invention will be apparent as it is better understood by reference to the following specification and the accompanying drawing, which illustrates diagrammatically an apparatus suitable for the practice of the improved method.

The present invention depends upon initial solution of the gaseous treating agent in a relatively small portion, preferably not over 10%, of the liquid to be treated under pressure. The compressed liquid solution of the gaseous treating agent is then released into the balance of the liquid to be treated at a lower pressure. The gaseous treating agent thus released from solution is in a much finer dispersion than is possible by the use of the usual porous dispersion blocks. Moreover, some of the gas remains in solution (depending upon Henry's law and the pressure of the main body of liquid) and is carried throughout the system to be released only as the liquid is released to atmospheric pressure. This is an important advantage, since it ensures maximum effectiveness of the gaseous treating agent by affording a longer contact time between the liquid and the gaseous treating agent.

The invention will be described more in detail in connection with the accompanying drawing which more or less diagrammatically illustrates an arrangement for the treatment of water, in a conduit which is a part of the distribution system, with ozone.

Referring to the drawing, a portion of the liquid to be treated, for example water, is supplied through a pipe 5 controlled by a valve 6, to a liquid jet eductor 7 to which the gaseous treating agent is supplied from a suitable source through a pipe 8. The liquid introduced through the nozzle 9 of the eductor creates suction, thus drawing the gas into intimate contact with the liquid and forming a coarse spray of liquid and gas, which travels through the pipe 9. Any suitable positive pressure pump such as the gear pump 10 compresses the mixture of liquid and gas delivered through the pipe 9' to a suitable pressure, for example from 50 to 100 pounds per square inch or higher. The compression should be sufficient in any case to ensure solution of the gaseous treating agent in the liquid at the higher pressure, so that the liquid delivered through the pipe 11 at the higher pressure is a solution of the gaseous treating agent in the liquid, no free gas bubbles remaining in the liquid as it passes through the pipe 11. A pressure gauge 12 may be connected to the pipe 11 to permit checking of the pressure therein. A check valve 13 is provided to prevent rearward passage of liquid through the pipe 11 when the pump 10 is not in operation. A valve 14 may be provided to close the pipe 11 when the system is not in operation.

The major portion of the liquid to be treated flows through a conduit 15 which is a part of the distribution system. The pressure therein may be, for example, from 5 to 25 pounds per square inch, i. e., the normal pressure of a water distribution system. The pipe 11 terminates in a nozzle 16 disposed within the conduit 15 to discharge the liquid solution of the treating gas into the conduit 15 in the direction of flow of liquid therethrough as indicated by the arrows. As the liquid solution of the gaseous treating agent is discharged from the nozzle 16, the dissolved gaseous treating agent is released in a highly dispersed form, and thus it is disseminated uniformly through the liquid to be treated, assuring maximum effectiveness of the gaseous reagent.

The expansion of the solution of the gaseous treating agent at high pressure must take place in contact with the liquid at a lower pressure. If the nozzle is eliminated and an ordinary valve is substituted therefor, expansion takes place in the valve, and much of the released gaseous treating agent develops into the form of larger bubbles before adequate mixing with the liquid is accomplished. The valve 14 must therefore be opened to its full capacity when the apparatus is in operation, so that the pressure of the solution in the pipe 11 is maintained until it is discharged through the nozzle 16.

As an example of the operation of the device, a pump 10, having a capacity of ten gallons of water per minute at 100 pounds per square inch gauge will afford excellent dispersion when two gallons of water per minute are supplied through the pipe 5 and 1.1 cubic feet of gas are introduced through the pipe 8. Two gallons of water will dissolve 10.6 grams of ozone if the ozone is at a concentration of 25% (by weight). At this concentration, the ozone-air mixture would occupy approximately 1.04 cubic feet at standard pressure. The pump operating under the above conditions requires approximately one and a quarter horsepower, and the operating cost would be in the neighborhood of one per cent per hour, approximately, depending upon power cost at the particular point. Such a plant is capable of adequately treating 1,000,000 gallons of water per day with ozone at a handling cost of 24c per day. This is less than one-tenth of the cost of operating a common absorption tower of similar capacity. Moreover, the space required for the system is approximately 25 cubic feet as compared to an estimated 175 cubic foot requirement for an absorption tower and pump.

In operating with ozone, it is desirable to employ relatively high concentrations. The minimum concentration of ozone in air or other gas such as oxygen or nitrogen which is applicable in accordance with the present invention is approximately 5%, since if lower concentrations are used, the proportion of water required to dissolve it becomes excessive. Concentrations of 25% are preferable, and the operation may be conducted even more effectively with higher concentrations up to 100%. It is not desirable to operate the process under conditions which require the use of more than approximately 10% by volume of the liquid to be treated as the solvent for the gaseous treating agent, because of the resulting increased size of the pump and the excessive power requirement for compression.

Among the advantages of the invention are the production of a finer dispersion of the gas in the liquid to be treated, reduction of the space requirements for necessary apparatus, insurance of longer contact time of gas with the liquid, and more economical equipment and operating cost. As already indicated, the apparatus is compact, being much smaller for a unit capacity than the apparatus required in the method heretofore used. Furthermore, owing to the fineness of dispersion of the gaseous treating agent, the treatment is much more efficient, thus reducing the quantity of the gaseous treating agent required to effect satisfactory treatment of a given quantity of the liquid to be treated.

The procedure is particularly effective in the treatment of water with ozone, since considerable saving can be effected in this application of the invention. It is equally desirable in handling other gaseous treating agents, and the application thereof to liquids where the gaseous treating agent is soluble in the liquid to be treated at pressures obtainable by the use of positive pressure pumps. Thus, in any case where the gaseous treating agent can be forced into solution by the application of pressure, the release of the solution from pressure into the liquid to be treated at a lower pressure ensures maximum dispersion of the gaseous treating agent in that liquid, and hence the more effective application of the gaseous treating agent for its intended purpose.

Various changes may be made in the procedure as described and in the apparatus utilized in connection therewith without departing from the invention or sacrificing the advantages thereof.

I claim:

1. The method of dispersing in liquids gaseous treating agents capable of being dissolved therein which comprises entraining the gaseous treating agent in a relatively small volume of the liquid to be treated, forming a flowing stream of the liquid and entrained gaseous treating agent, compressing the flowing stream of liquid and entrained gaseous treating agent, the amount of the gaseous treating agent introduced into said relatively small volume of liquid being so correlated with the pressure to which the flowing stream of liquid and gaseous treating agent is subjected that substantially complete dissolution of the gaseous treating agent in the liquid is obtained, and introducing the resulting solution, without such reduction of the pressure thereon as would result in a release of an appreciable amount of the gaseous treating agent from the solution, directly into the balance of the liquid to be treated at a lower pressure, the difference in pressure under which the flowing stream of liquid being treated and the solution, respectively, are maintained being such that the gas of said solution is released into the flowing stream of the liquid being treated in a highly dispersed form.

2. The method of claim 1 in which the gaseous treating agent is mixed at a concentration of more than 5% with another gaseous agent.

3. The method of claim 1 in which the pressure under which said solution is maintained is at least four times that under which the flowing stream of liquid being treated is maintained.

4. The method of purifying water which comprises entraining ozone in a relatively small volume of the water to be treated, forming a flowing stream of such small volume of water and entrained ozone, compressing the flowing stream sufficiently to cause solution of the ozone thereof in the water in which it is entrained, and introducing the resulting solution, without such previous reduction of the pressure thereon as would result in a release of an appreciable amount of the ozone from the solution, directly into the balance of the water to be purified at a lower pressure, the difference in pressure under which the flowing stream of water and the solution, respectively, are maintained being such that ozone of said solution is released into the flowing stream of water in a highly dispersed form.

5. The method of claim 4 in which the ozone is mixed at a concentration of more than 5% with another gaseous agent.

6. The method of dispersing in liquids gaseous treating agents capable of being dissolved therein which comprises entraining the gaseous treating agent in a volume of liquid which does not exceed about 10% by volume of the liquid to be treated, forming a flowing stream of the liquid and entrained gaseous treating agent, compressing the flowing stream of liquid and entrained gaseous treating agent sufficiently to cause solution of the gaseous treating agent thereof in the liquid, and introducing the resulting solution, without such reduction of the pressure thereon as would result in a release of an appreciable amount of the gaseous treating agent from the solution, directly into the liquid to be treated at a lower pressure, the difference in pressure under which the flowing stream of liquid being treated and the solution, respectively, are maintained being such that gas of said solution is released into the flowing stream of the liquid being treated in a highly dispersed form.

7. The method of claim 6 in which the gaseous treating agent is ozone.

8. The method of purifying water which comprises entraining ozone in a volume of water which is not more than about 10% by volume of the water to be purified, forming a flowing stream of such water and the entrained ozone, compressing the flowing stream, the amount of the ozone introduced into the relatively small amount of water being so correlated with the pressure to which the flowing stream of water and ozone is subjected that substantially complete dissolution of the ozone in the water of such stream is obtained, and introducing the resulting solution, without such reduction of the pressure thereon as would result in a release of an appreciable amount of the ozone from the solution, directly into the water to be purified at a lower pressure, the difference in pressure under which the flowing stream of water and the solution, respectively, are maintained being such that ozone of said solution is released into the flowing stream of water in a highly dispersed form.

CLARK E. THORP.

REFERENCES CITED

The following references are of record in the file of this patent:

UNITED STATES PATENTS

| Number | Name | Date |
|---|---|---|
| 1,103,211 | Knips | July 14, 1914 |
| 1,590,120 | Perry | June 22, 1926 |
| 2,048,158 | Goodwin | July 21, 1936 |
| 2,055,808 | Wait | Sept. 29, 1936 |
| 2,062,231 | Ornstein | Nov. 24, 1936 |
| 2,237,882 | Lawlor et al. | Apr. 8, 1941 |
| 2,370,772 | Bowers | Mar. 6, 1945 |

FOREIGN PATENTS

| Number | Country | Date |
|---|---|---|
| 117,259 | Australia | July 22, 1943 |